Oct. 22, 1963  H. R. KILLIAN  3,107,931
PIPE EXPANSION JOINT
Filed June 1, 1959
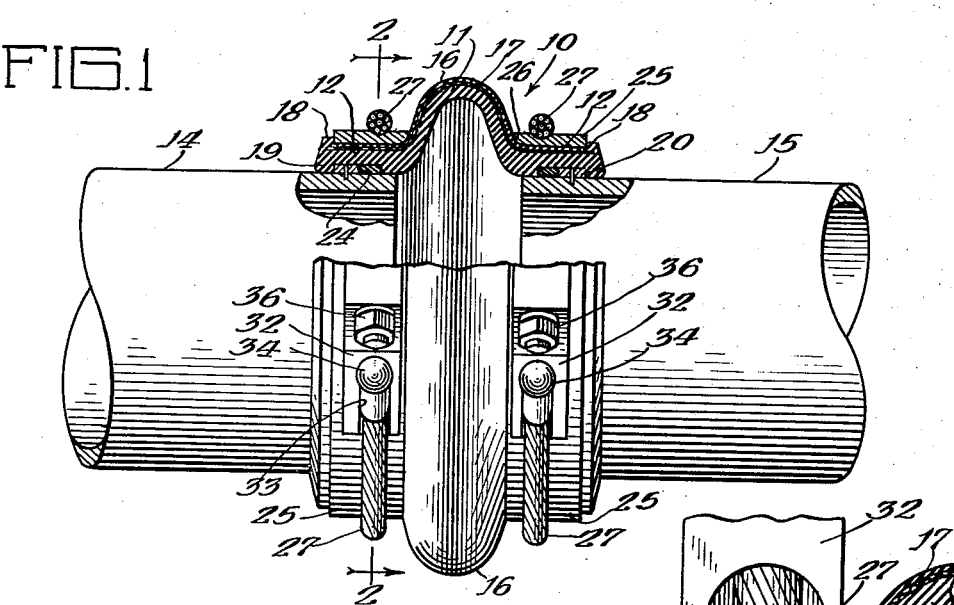
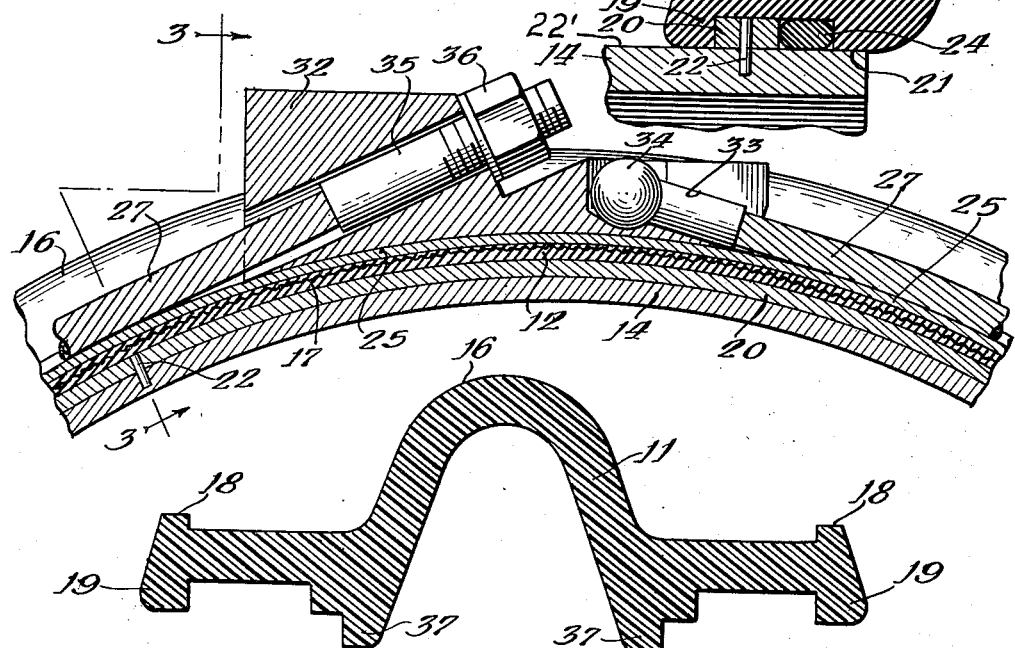
Inventor:
Henry R. Killian
By: Hofgren, Brady,
Wegner, Allen & Stellman
Attorneys

United States Patent Office 3,107,931
Patented Oct. 22, 1963

3,107,931
PIPE EXPANSION JOINT
Henry R. Killian, Chicago, Ill., assignor to Henry Pratt Company, a corporation of Illinois
Filed June 1, 1959, Ser. No. 817,193
3 Claims. (Cl. 285—108)

This invention relates to pipe joining coupler and more particularly to a flexible pressure-tight pipe coupler adapted to join lengths of large diameter pipes even though the pipes are not accurately aligned.

In power plant piping in large sizes it has been customary to use bolted flange construction. The insertion of valves, the connection of pipes, elbows and straight lengths generally done with the flanged type of construction required that each component of such a piping installation must be very accurately made in order that the flanges mate. The piping in such power plant work generally is required to handle water under superatmospheric pressure of the order of 50 pounds per square inch. The difficulties in fitting pipes in diameters from one foot up to as much as eight to ten feet is immediately apparent when each type of component must be so accurately made that its flanges fit exactly with other piping of any installation. Under these circumstances there has been very little field fitting of components of such piping. Any component which was not the right length within a very small tolerance had to be recast or remade.

The present invention provides a type of pipe coupling which may be applied to the straight ends of the pipe in the field without any particular machining, or preparatory work to the pipe ends. Straight pipe sections can easily be cut to any desired length in the field or at the construction site. The pipe coupler of this invention therefore provides a means for joining pipes in the field at much less cost than was previously thought possible.

The present pipe coupler, in addition to providing a means for coupling pipes together, also permits considerable flexibility of one pipe section relative to another. The coupling itself has a feature permitting the installation into systems which, for example, are subject to vibration or require movement due to thermal changes or other reasons. Considerable flexibility between the joint pipe sections are permitted by the instant structure.

It is the primary object of my invention to provide a new and improved pipe coupler particularly for relatively large diameter piping.

Another object of the present invention is to provide a pipe coupling device permitting relatively great tolerance in the fitting of components of a piping system.

Another object is to provide a pipe coupling device easily applied in the field at the site of a particular piping installation.

Another object is to provide a coupling device of the character described which is flexible and may be used in coupling large diameter piping in water pressure systems.

Another object is to provide a flexible pipe coupler which may be applied to straight pipe sections in the field without requiring machining of the pipe sections.

Still another object is to provide a coupler of the character described which is particularly durable for long service life without maintenance.

These and other objects and advantages will be more apparent from the following detailed description of preferred embodiments illustrated in the accompanying drawing, in which:

FIGURE 1 is a broken plan view of a pair of straight pipe sections joined by the coupler of this invention and having a portion of the coupler broken away for clarity of illustration;

FIGURE 2 is an enlarged fragmentary sectional view of a portion of the pipe coupler taken substantially along line 2—2 in FIGURE 1;

FIGURE 3 is an enlarged fragmentary sectional view of the device taken substantially as indicated along line 3—3 of FIGURE 2; and FIGURE 4 is an enlarged sectional view through an alternate form of the flexible annulus of the coupling member.

The preferred embodiment, as illustrated by the drawings, is a separately fabricated coupling device which can be attached to the straight ends of a pipe in the field without the need for any machined parts. The insertion of valves into a pipe line may also be accomplished by the use of the pipe coupler of this invention.

The structure of the present pipe coupler is intended to be applied to the straight ends of the pipe as found in the field. Such pipe is of a cast variety and is somewhat rough on its exterior surface and no machining of this surface is required in order to apply the pipe coupling device of the present invention. Referring to FIGURE 1, a pair of pipe sections 14 and 15 are shown with their ends spaced apart leaving a gap therebetween which may be covered and connected by the pipe couplers of this invention. The coupler 10 had a main body which is an annulus or sleeve of flexible material having at either end a cylindrical, annular nipple portion 12 adapted to fit over the outside of the pipe section to be joined. Between the cylindrical end sections of the pipe annulus is an outwardly extending tire-like outwardly enlarged section 11 which, because of its shape, permit the end sections to move toward or apart from each other with consequent bending of the intermediate section of the coupling. This flexibility of the central section lends flexibility to the joint as a whole. The cylindrical end sections of the annulus remain in place on the pipe sections and will move with the pipe sections should any such movement occur.

The material of the annulus is preferably of a resilient, relatively soft material capable of withstanding the pressure to which the pipe is liable to be subjected. A rubber material with a reinforcing of mesh or canvas has been proved satisfactory. In FIGURE 1, the annulus of the coupler 10 is a rubber material having therein a canvas backing 17 near its outer periphery and molded in place in the material. The end sections are applied directly to the pipe line and generally the diameter of the inside of the end sections is such as to slip rather snugly over the outer diameter of the pipe sections. The particular illustration, though of smaller scale, is shown as connected to a 24 inch nominal diameter pipe.

The particular manner in which the ends of the annulus are connected to the pipe line may be best seen from an examination of FIGURE 3. Therein it will be noted that the cylindrical extent of the annulus is provided with an inner surface 21 in contact with the outer surface 22' of the pipe itself. Spaced from the end face of the pipe line, a short distance is a metal retaining ring 20 which is pinned to the pipe line as by pins 22. This ring is annular and extends about the entire circumference of the pipe. The rings may be applied in the field and serve to hold the annulus in position relative to the pipe line.

As further shown in FIGURE 3, the cylindrical end portions of the annulus have an inner annular groove slightly wider than the annular ring 20. An outer flange 19 is provided to abut the annular metal ring at its outer extent. The groove in the cylindrical section is sufficiently large to accommodate an O-ring 24 on the side of the metal ring facing the end face of the pipe line. The O-ring has metal of the pipe and ring against which to seat.

The outer extent of the cylindrical section of the annulus is also provided with a groove inside an outer flange 18 to accommodate a backing ring plate 25. This plate extends around the cylindrical section in contact with the rubber or other flexible material of the annulus and is intended to hold the annulus from outward extension radially from the pipe line. To assure that the cylindrical sections do not expand away from the pipe line, a cable 27 extends around the cylindrical section holding the metal plate 25 in place and thus maintaining the rubber cylindrical section of the annulus in shape. The length of plate 25 is chosen to allow its ends to almost abut when wrapped around the cylindrical section. The O-ring 24 is subjected to the internal pressure of the pipe line and is backed up by metal on two sides, as described, and by the rubber of the cylindrical section on its outer periphery which, in turn, is backed up by the metal 25 of the surrounding ring. The shape of the recess receiving the O-ring is maintained against substantial distention and in this manner the O-ring may seal effectively against the loss of liquid past the same.

Many irregularities are found in pipe line surfaces particularly in the larger sizes. Even the smaller sizes of one foot up to two feet or more, which are cast, are generally quite rough on the exterior surface. The resilient character of the annulus forming the coupling member is such that it may accommodate itself to any such irregularities and may conform to flat spots in the outer surfaces of the pipe lines without any difficulty. The cable members are drawn up in a saddle block 32 in such a manner as to apply inwardly and radially directed forces on the annulus throughout 360°. Under such circumstances, all parts of the resilient annulus are forced into intimate contact with the outer surface of the pipe line and no spaces are left through which leakage could occur. The contact of the rubber annulus against the outer surface of the metal ring 20 is thus continuous throughout the 360° and provides a completely closed groove in which the O-ring 24 may act in the usual manner. The saddle block has an inner surface curved to fit the particular pipe coupler used. The block is provided with a socket 33 to receive a ball fitting 34 on the end of the cable. The opposite end is provided with a threaded fitting 35 which can be drawn up by a nut 36 to tension the cable and produce inwardly directed force on the metal plate 25 and the underlying section of the annulus of the coupler.

The form of the resilient annulus may be different than that shown in FIGURES 1 and 2 in that the member may be a continuous annular polyvinyl chloride molded member. In FIGURE 4 such a member is illustrated. In addition to the structure shown in FIGURES 1 and 2 for maintaining the cylindrical portions of the member on the pipe line in the selected position, a flange such as 37 on the inner extent of the outwardly bowed section 16 may be made so as to abut the inner ends of the connected pipe lines. The pressure within the flexible joint tends to slide the cylindrical sections of the joint longitudinally of the pipe line away from the gaps between the ends of the pipe. The flange 37 in abutting the end of the pipe line, prevents the coupling member cylindrical sections from sliding longitudinally of the pipe line, leaving the central section in its bowed shape so as to absorb any movement that may occur between the pipe line sections. Either method illustrated for holding the cylindrical sections of the coupling member against sliding relative to the straight pipe section is satisfactory. The metal ring 20 is used in either instance to back up the O-ring seal.

The present coupling member may be used to insert valves within piping in the field, permitting sufficient flexibility in the coupling to avoid the necessity of very close tolerance fitting between flanged sections. A straight nipple on the side of the valve housing may mount the coupling member, permitting the outer end to be connected to the straight end sections of the pipe line in the field. It should be understood that while the description of this particular coupler has been related to field installation, that it may be used elsewhere and with equal facility.

The foregoing detailed description has been given for clearness of understanding only, and no unnecessary limitations should be understood therefrom for some modifications will be obvious to those skilled in the art.

I claim:

1. A coupler for joining together large diameter pipes, comprising: an annulus of flexible material having a central passageway extending longitudinally therethrough and end sections telescoping respectively over adjacent straight pipe sections to be joined to permit continuous fluid flow between the joined pipes, said pipe sections having a generally uninterrupted outer surface, said end sections of said annulus each having an inwardly facing annular groove adjacent the outer uninterrupted surface of each pipe section; a metal ring secured to the outer surface of each joined pipe section with each ring respectively reposing in one of said inwardly facing grooves; sealing means in said grooves beside said metal rings and sealingly engaging respectively the outer uninterrupted surface of said pipe sections, the metal ring and the annulus under fluid pressure; and metallic backing means urging said end sections of said coupler radially inwardly and tightly about said pipe sections throughout 360° about said pipe sections, said backing means being positioned in radial alignment with said sealing means in said groove to prevent change in the size of said groove permitting said sealing means to be forced by internal pressure against said pipe section outer surface and said metal ring, sealing the coupler to the pipe sections.

2. A pipe coupler for joining together large diameter pipes, comprising: a sleeve member having a pair of relatively flexible nipple sections each adapted to telescope over a straight section of pipe having a generally continuous uninterrupted cylindrical surface, each of said nipple sections having an annular groove facing radially inwardly and positioned to be opposite the outer surface of said pipe section when in said telescoped relation; an O-ring within said groove in pressure sealing engagement with said pipe section and said nipple section; a metal ring secured to said pipe section in position to repose in said groove in said nipple section, said metal ring maintaining said pipe coupler against movement longitudinally of said pipe section and clamping means annularly surrounding said nipples and urging the entire periphery of said nipple section radially inwardly toward the pipe surface to confine said O-ring in said sealing position.

3. A coupler for joining together large diameter pipes, comprising: an annulus of relatively soft material having a central flexible section and a cylindrical end section at opposite ends, a radially inwardly open groove in each end section, said end sections being shaped to telescope over straight pipe sections to be joined having generally uninterrupted outer surfaces, and means for sealing said end sections to said pipe sections in liquid tight fashion including a pressure seal between each said end section and the outer surface of said respective pipe section and being in pressure sealing contact with both the pipe section outer surface and the end section of the annulus, a metal ring secured to said pipe section in position to repose in said groove in said end section, said metal ring maintaining said pipe coupler against movement longitudinally of said pipe section, and metallic clamping means urging the end section directly over said pressure seal radially inwardly against said pipe section through the entire 360° periphery of said pipe section, preventing movement of said pressure seal away from said pipe section surface under influence of pressure within the pipes.

References Cited in the file of this patent

UNITED STATES PATENTS

| | | |
|---|---|---|
| 809,903 | Bowers | Jan. 9, 1906 |
| 1,052,112 | Welch | Feb. 4, 1913 |
| 1,916,479 | Howell | July 4, 1933 |
| 2,784,990 | Pollia | Mar. 12, 1957 |

FOREIGN PATENTS

| | | |
|---|---|---|
| 140,733 | France | Jan. 2, 1881 |
| 2,456 | Great Britain | Feb. 3, 1899 |
| 27,636 | Great Britain | Dec. 9, 1911 |
| 465,790 | Germany | Dec. 12, 1926 |
| 212,881 | Australia | Apr. 18, 1957 |